United States Patent
Huang et al.

(10) Patent No.: US 10,244,441 B2
(45) Date of Patent: Mar. 26, 2019

(54) MEASUREMENT GAP ENHANCEMENT TO REDUCE MEASUREMENT DELAY

(71) Applicant: Intel IP Corporation, Santa Clara, CA (US)

(72) Inventors: Rui Huang, Beijing (CN); Yang Tang, Pleasanton, CA (US); Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/566,139

(22) PCT Filed: Dec. 23, 2015

(86) PCT No.: PCT/US2015/000259
§ 371 (c)(1),
(2) Date: Oct. 12, 2017

(87) PCT Pub. No.: WO2016/182526
PCT Pub. Date: Nov. 17, 2016

(65) Prior Publication Data
US 2018/0098253 A1 Apr. 5, 2018

Related U.S. Application Data

(60) Provisional application No. 62/161,772, filed on May 14, 2015.

(51) Int. Cl.
*H04B 1/26* (2006.01)
*H04W 36/00* (2009.01)
*H04W 24/10* (2009.01)

(52) U.S. Cl.
CPC ....... *H04W 36/0094* (2013.01); *H04W 24/10* (2013.01); *H04W 36/0088* (2013.01)

(58) Field of Classification Search
CPC .......................... H04W 24/10; H04W 36/0088
(Continued)

(56) References Cited

U.S. PATENT DOCUMENTS

2010/0309803 A1* 12/2010 Toh ................. H04L 1/0006
370/252
2014/0341192 A1* 11/2014 Venkob .............. H04L 5/001
370/336

FOREIGN PATENT DOCUMENTS

| WO | 2012122673 A1 | 9/2012 |
| WO | 2014184602 A1 | 11/2014 |
| WO | 2015018025 A1 | 2/2015 |

OTHER PUBLICATIONS

International Search Report and Written Opinion dated Jun. 15, 2016, from International Application No. PCT/US2015/000259, 22 pages.

(Continued)

*Primary Examiner* — Sanh D Phu
(74) *Attorney, Agent, or Firm* — Schwabe, Williamson & Wyatt, P.C.

(57) ABSTRACT

Techniques for enhancing the inter-frequency measurement gap to reduce measurement delay between an user equipment (UE) and an evolved NodeB (eNB). These embodiments may include identifying, by a UE, a measurement gap configuration that includes a measurement gap repetition period (MGRP), that is less than 40 milliseconds, ms; and performing inter-frequency or inter-radio access technology, RAT, measurement based on the measurement gap configuration. The embodiments may also include receiving, by an eNB, a request from a UE, for a measurement gap configuration that includes a measurement gap repetition period (MGRP) less than 40 ms; and transmitting an indication of (Continued)

a gap pattern that includes a MGRP that is less than 40 ms. Other embodiments may be described and/or claimed.

22 Claims, 17 Drawing Sheets

(58) Field of Classification Search
USPC .......................................................... 455/323
See application file for complete search history.

(56) References Cited

OTHER PUBLICATIONS

Intel Corporation, "Further considerations on the measurement gap pattern in HeNet," 3GPP TSG-RAN WG4 Meeting #70, R4-140613, Agenda Item: 7.3, Feb. 10-14, 2014, Prague, Czech Republic, 5 pages.
Intel Corporation, "On measurement gap enhancement," 3GPP TSG-RAN WG4 Meeting #74BIS, R4-152185, Agenda item: 9.4.1, Apr. 20-24, 2015, Rio de Janeiro, Brazil, 4 pages.
Intel Corporation, "On measurement gap enhancement for Hetnet," 3GPP TSG-RAN WG4 Meeting #75, R4-153583, Agenda Item: 9.4.1, May 25-29, 2015, Fukuoka, Japan, 3 pages.
3GPP, "Technical Specification Group Radio Access Network; Evolved Universal Terrestrial Radio Access (E-UTRA); Radio Resource Control (RRC); Protocol specification (Release 12)," 3GPP TS 36.331 V12.5.0 (Mar. 2015), Mar. 27, 2015, Lte Advanced, 445 pages.
3GPP, "Technical Specification Group Radio Access Network; Evolved Universal Terrestrial Radio Access (E-UTRA); Requirements for support of radio resource management (Release 12)," 3GPP TS 36.133 V12.7.0 (Mar. 2015), Apr. 3, 2015, Lte Advanced, 1014 pages.
3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 2)," 3GPP TS 36.300 V12.5.0 (Mar. 2015), Mar. 25, 2015, Lte Advanced, 251 pages.
European Patent Office—Article 94(3) dated Oct. 22, 2018 from European Patent Application No. 15828896.9, 16 pages.

* cited by examiner

```
                    RRCConnectionReestablishmentRequest           message             650

-- ASN1START

RRCConnectionReestablishmentRequest ::= SEQUENCE {
    criticalExtensions              CHOICE {
        rrcConnectionReestablishmentRequest-r8    RRCConnectionReestablishmentRequest-r8-IEs,
        criticalExtensionsFuture        SEQUENCE {}
    }
}

RRCConnectionReestablishmentRequest-r8-IEs ::= SEQUENCE {
    ue-Identity              ReestabUE-Identity,
    reestablishmentCause     ReestablishmentCause,
    spare                    BIT STRING (SIZE (2))
}

ReestabUE-Identity ::=  SEQUENCE {
    c-RNTI           C-RNTI,
    physCellId       PhysCellId,
    shortMAC-I       ShortMAC-I
}

ReestablishmentCause ::= ENUMERATED {
                reconfigurationFailure, handoverFailure,
                ⌐shortMeasGapRequest¬, otherFailure, spare1}
                                  652

-- ASN1STOP

FIG. 6D
```

Table 8.1.2.1-1: Gap Pattern Configurations supported by the UE

| Gap Pattern Id | MeasurementGap Length (MGL, ms) | MeasurementGap Repetition Period (MGRP, ms) | Minimum available time for inter-frequency and inter-RAT measurements during 480ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 6 or <6 | 10 | 48*5 | |
| 3 | 6 or <6 | 20 | 25*5 | |

FIG. 6F

*MeasObjectEUTRA* information element

```
-- ASN1START

MeasObjectEUTRA ::=                    SEQUENCE {
    carrierFreq                            ARFCN-  ValueEUTRA,
    allowedMeasBandwidth                   AllowedMeasBandwidth,
    presenceAntennaPort1                   PresenceAntennaPort1,
    neighCellConfig                        NeighCellConfig,
    offsetFreq                             Q- OffsetRange              DEFAULT dB0,
    -- Cell list
    cellsToRemoveList                      CellIndexList               OPTIONAL,    -- Need ON
    cellsToAddModList                      CellsToAddModList           OPTIONAL,    -- Need ON
    -- Black list
    blackCellsToRemoveList                 CellIndexList               OPTIONAL,    -- Need ON
    blackCellsToAddModList                 BlackCellsToAddModList      OPTIONAL,    -- Need ON
    cellForWhichToReportCGI                PhysCellId                  OPTIONAL,    -- Need ON
    ...,
    [[out-of-sync-     indicator    -   r13    BOOLEAN     OPTIONAL,                --Need ON
       shortGapRequestEnable         -   r13    BOOLEAN     OPTIONAL,                --Need ON
    ]],
    [[measCycleSCell-r10                   MeasCycleSCell   -r10       OPTIONAL,    -- Need ON
        measSubframePatternConfigNeigh-r10    MeasSubframePatternConfigNeigh-r10   OPTIONAL
            -- Need ON
    ]],
    [[widebandRSRQ   -Meas-r11             BOOLEAN OPTIONAL            -- Cond WB-RSRQ
    ]],
    [[   altTTT-  CellsToRemoveList    -r12    CellIndexList           OPTIONAL,    -- Need ON
         altTTT-  CellsToAddModList    -r12    AltTTT-  CellsToAddModList-r12   OPTIONAL,    -- Need
ON
         t312-r12                          CHOICE {
             release                           NULL,
             setup                             ENUMERATED {ms0, ms50, ms100, ms200,
                                                   ms300, m     s400, ms500, ms1000}
         }                                                              OPTIONAL,    -- Need ON
         reducedMeasPerformance   -r12     BOOLEAN                     OPTIONAL,    -- Need ON
         measDS-Config-r12                 MeasDS-Config-r12           OPTIONAL     -- Need ON
    ]]
}
```

702 points to the boxed [[out-of-sync- indicator / shortGapRequestEnable]] block. 700 labels the overall figure.

FIG. 7

UE requests using of short gap by new measurement event configuration.

```
                    ReportConfigEUTRA    information element
-- ASN1START

ReportConfigEUTRA ::=           SEQUENCE {
    triggerType                     CHOICE {
        event                           SEQUENCE {
            eventId                         CHOICE {
                eventA1                         SEQUENCE {
                    a1-Threshold                    ThresholdEUTRA
                },
                eventA2                         SEQUENCE {
                    a2-Threshold                    ThresholdEUTRA
                },
                eventA3                         SEQUENCE {
                    a3-Offset                       INTEGER (-30..30),
                    reportOnLeave                   BOOLEAN
                },
                eventA4                         SEQUENCE {
                    a4-Threshold                    ThresholdEUTRA
                },
                eventA5                         SEQUENCE {
                    a5-Threshold1                   ThresholdEUTRA,
                    a5-Threshold2                   ThresholdEUTRA
                },
                ...,
                eventG1-r13                     CHOICE {
                    g1-out-of-sync                  BOOLEAN,
                    g1-threshold1                   ThresholdEUTRA
                },
                eventA6-r10                     SEQUENCE {
                    a6-Offset-r10                   INTEGER (-30..30),
                    a6-ReportOnLeave-r10            BOOLEAN
                },
                eventC1-r12                     SEQUENCE {
                    c1-Threshold-r12                ThresholdEUTRA-v1250,
                    c1-ReportOnLeave-r12            BOOLEAN
                },
                eventC2-r12                     SEQUENCE {
                    c2-RefCSI-RS-r12                MeasCSI-RS-Id-r12,
                    c2-Offset-r12                   INTEGER (-30..30),
                    c2-ReportOnLeave-r12            BOOLEAN
                }
            },
            hysteresis                      Hysteresis,
            timeToTrigger                   TimeToTrigger
        },
        periodical                      SEQUENCE {
            purpose                         ENUMERATED {
                                                reportStrongestCells, reportCGI}
        }
    },
```

(eventG1-r13 block labeled 802; overall structure labeled 800a)

FIG. 8A

```
    triggerQuantity               ENUMERATED {rsrp, rsrq},
    reportQuantity                ENUMERATED {sameAsTriggerQuantity, both},
    maxReportCells                INTEGER (1..maxCellReport),
    reportInterval                ReportInterval,
    reportAmount                  ENUMERATED {r1, r2, r4, r8, r16, r32, r64,
infinity},
    ...,
    [[  si-RequestForHO-r9        ENUMERATED {setup}        OPTIONAL,      --
Cond reportCGI
        ue-RxTxTimeDiffPeriodical-r9    ENUMERATED {setup}   OPTIONAL       --
Need OR
    ]],
    [[  includeLocationInfo-r10   ENUMERATED {true}         OPTIONAL,      --
Need OR
        reportAddNeighMeas-r10    ENUMERATED {setup}        OPTIONAL       --
Need OR
    ]],
    [[  alternativeTimeToTrigger-r12      CHOICE {
            release                          NULL,
            setup                            TimeToTrigger
        }                                              OPTIONAL,   -- Need ON
        useT312-r12               BOOLEAN       OPTIONAL,   -- Need ON
        usePSCell-r12             BOOLEAN       OPTIONAL,   -- Need ON
        aN-Threshold1-v1250       RSRQ-RangeConfig-r12      OPTIONAL,
-- Need ON
        a5-Threshold2-v1250       RSRQ-RangeConfig-r12      OPTIONAL,
-- Need ON
        reportStrongestCSI-RSs-r12    BOOLEAN    OPTIONAL,   -- Need ON
        reportCRS-Meas-r12        BOOLEAN       OPTIONAL,   -- Need ON
        triggerQuantityCSI-RS-r12 BOOLEAN       OPTIONAL            -- Need
ON
    ]]
}

RSRQ-RangeConfig-r12 ::=          CHOICE {
    release                           NULL,
    setup                             RSRQ-Range-v1250
}

ThresholdEUTRA ::=                CHOICE{
,

-- ASN1STOP
```

FIG. 8B

MEASUREMENT GAP ENHANCEMENT TO REDUCE MEASUREMENT DELAY

CROSS REFERENCE TO RELATED APPLICATIONS

The present application is a national phase entry under 35 U.S.C. § 371 of International Application No. PCT/US2015/000259, filed Dec. 23, 2015, entitled "MEASUREMENT GAP ENHANCEMENT TO REDUCE MEASUREMENT DELAY", which designates the United States of America, which claims priority under 35 U.S.C. § 119(e) to U.S. Provisional Patent Application No. 62/161,772 entitled "ONE METHOD OF MEASUREMENT GAP ENHANCEMENT TO REDUCE THE MEASUREMENT DELAY" and filed May 14, 2015, the entire specifications of which are hereby incorporated by reference in their entireties for all purposes, except for those sections, if any, that are inconsistent with this specification.

FIELD

Embodiments of the present disclosure relate generally to the field of wireless communications, and more particularly, to enhancing a measurement gap process to reduce measurement delay.

BACKGROUND

LTE Release 12, $3^{rd}$ Generation Partnership Project (3GPP) introduces the capability of measurement gaps to measure the different frequencies of a neighbor cell and inter-Radio Access Technology (RAT) from a current cell, to identify when a neighboring frequency cell may have a better signal than the current cell.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one. It should also be noted that references to an "example" are references to non-limiting examples, unless otherwise stated.

FIG. 6D is a text block illustrating a short measurement gap request within the RRCConnectionReestablishmentRequest variable to request a new shorter MGRP, according to embodiments.

FIG. 6F is a text block illustrating gap pattern configuration identifiers to a table, according to embodiments.

FIG. 7 is a text block illustrating a short gap request enable (shortGapRequestEnable) variable to a measurement object in evolved universal terrestrial radio access (MeasObjectEUTRA) IE, according to embodiments.

FIG. 8A is a text block illustrating an event to a report configuration evolved universal terrestrial radio access (ReportConfigEUTRA) IE, according to embodiments.

FIG. 8B is a continuation of the text block of FIG. 8A.

DETAILED DESCRIPTION

Figure 1:
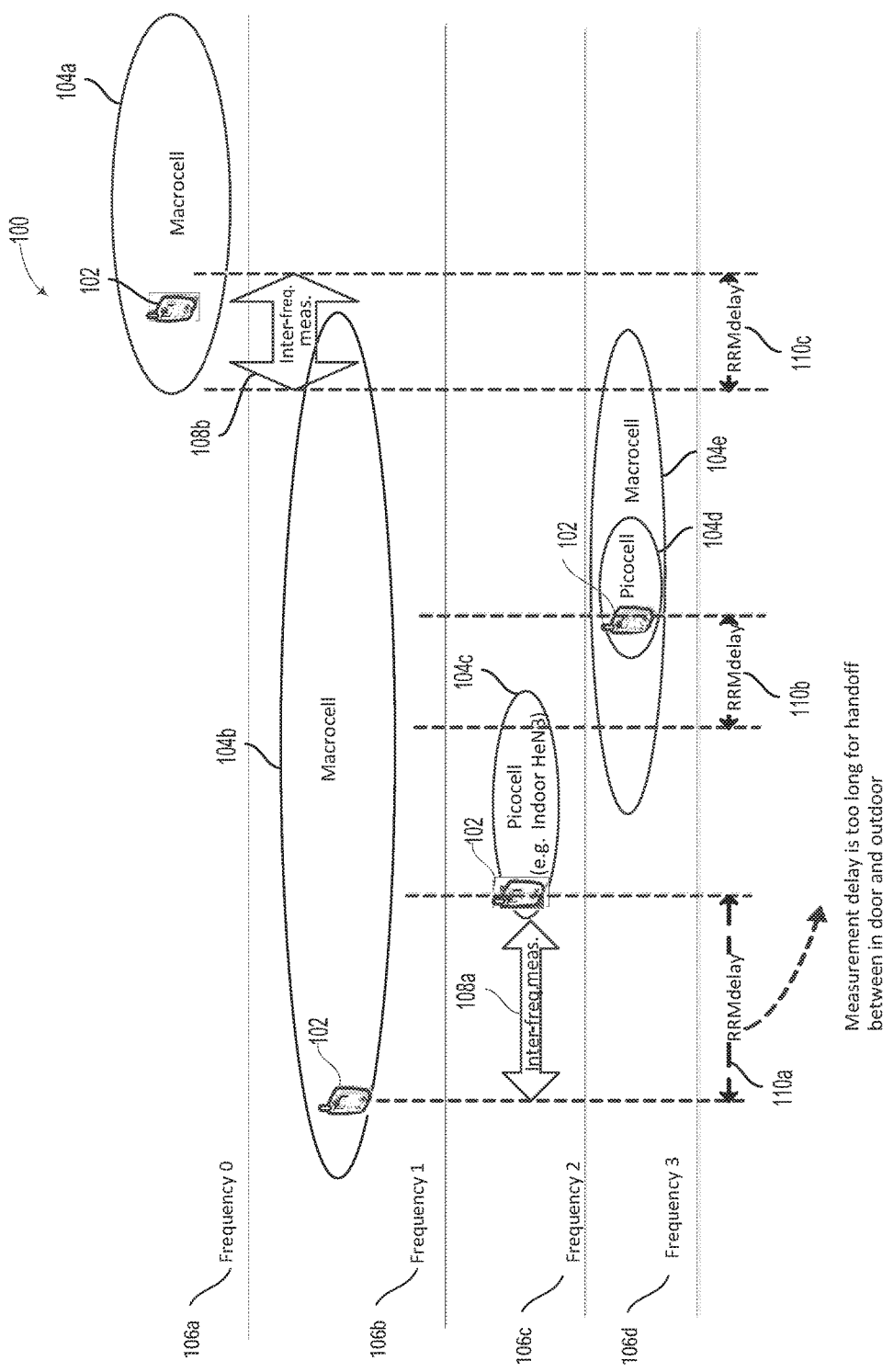
FIG. 1 is a diagram illustrating macro cells and pico cells on different frequencies having different length inter-frequency measurement gaps to determine handoffs for a user equipment (UE) device, according to embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configuration are set forth in order to provide a thorough understanding of the illustrative embodiments. However, it will be apparent to those skilled in the art that alternate embodiments may be practiced without the specific details. In other instances, well-known features are omitted or simplified in order to avoid obscuring the illustrative examples.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware modules.

In embodiments, the disclosure herein may refer to processes, apparatus, and/or techniques for enhancing the inter-frequency measurement gap to reduce measurement delay between user equipment (UE) and an evolved NodeB (eNB). These embodiments may include identifying, by a UE, a measurement gap configuration that includes a measurement gap repetition period, MGRP, that is less than 40 milliseconds (ms) and performing inter-frequency or inter-radio access technology, RAT, measurement based on the measurement gap configuration. The embodiments may also include receiving, by an eNB, a request from a UE, for a measurement gap configuration that includes a measurement gap repetition period, MGRP, less than 40 ms; and transmitting an indication of a gap pattern that includes a MGRP that is less than 40 ms.

The inter-frequency measurement requirement on the maximum time of cell identification and RSRP/RSRQ measurement for FDD (3GPP TS36.133 v12.7.0), may be given as:

$$T_{Identify\_Inter} = T_{Basic\_Identify\_Inter} \cdot \frac{480}{T_{Inter1}} \cdot N_{freq} \text{ ms} \quad (1)$$

$$T_{measurement\_perid\_inter\_FDD} = 480 \cdot N_{freq} \text{ ms} \quad (2)$$

Where: $T_{Basic\_Identify\_Inter}$=480 ms. In embodiments, it may be the time period used in the inter frequency equation where the maximum allowed time for the UE to identify a new FDD inter-frequency cell is defined. Nfreq is defined in clause 8.1.2.1.1. Tinter1 is defined in clause 8.1.2.1, which in embodiments may be the minimum available time for inter-frequency and inter-RAT measurements during a 480 ms period.

According to the practical testing results, existing cell identification requirements may be loose and UE behavior may be inconsistent. Thus, although most UEs may meet existing measurement delay requirements, which may include cell identification delay, the measurement delay performance may be improved for new scenarios, such as, for example, user equipment handoff from an outdoor macro cell to indoor pico cell. Legacy measurement gap configurations may introduce a measurement gap delay that may not be feasible with respect to these scenarios.

FIG. 1 is a diagram illustrating macro cells and pico cells on different frequencies having different length inter-frequency measurement gaps to determine handoffs for a UE device, according to embodiments. In diagram 100, a UE 102, such as a smart phone or other wireless device may operate among a number of different frequency bands 106a-106d, within a number of different cells 104a-104e. For example, the UE 102 may operate at or near frequency 1 106b in a macro cell 104b. Subsequently, after an inter-frequency measurement 108a, the UE 102 may be handed off to a first pico cell 104c, which may be operated, for example, by an indoor home evolved NodeB (HeNB). As shown, in this scenario, the associated radio resource measurement (RRM) delay, which may be proportional to an MGRP, may be too long for the handoff of the UE 102 from the macro cell 104b to the pico cell 104c.

Thus, as is shown in the diagram by the inter-frequency measurement gap 108a and the longer RRM delay 110a, the longer legacy measurement gap delay would not be feasible in the depicted scenario.

Figure 2:
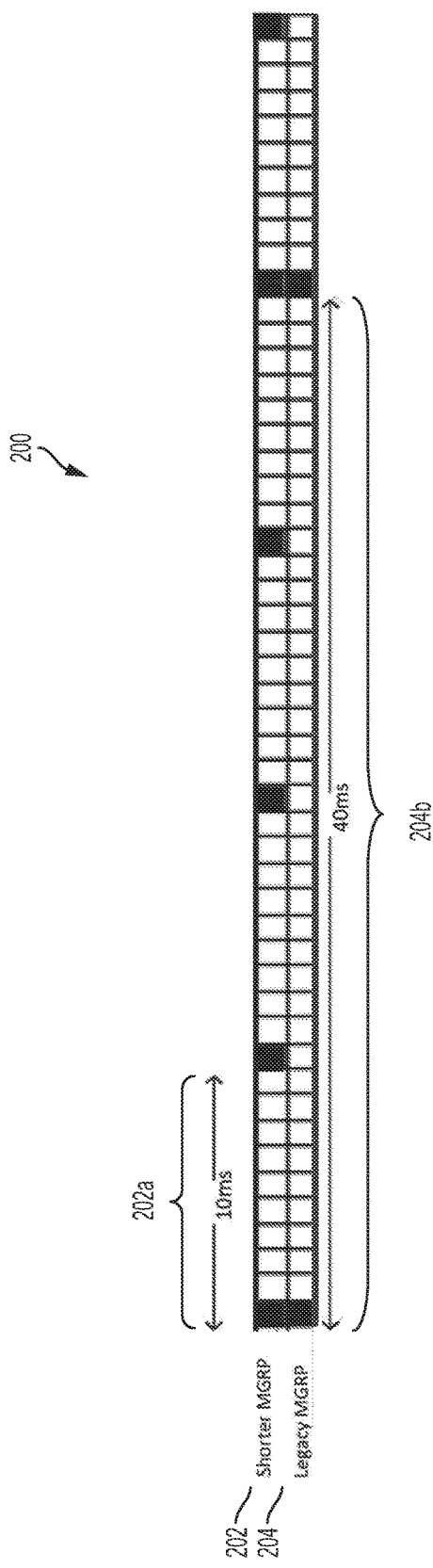
FIG. 2 is a diagram illustrating a legacy measurement gap and a shorter measurement gap with shorter measurement gap repetition period (MGRP), according to embodiments.

FIG. 2 is a diagram illustrating a legacy MGRP and a shorter MGRP, according to embodiments.

In embodiments, to reduce the measurement delay, the measurement gap may be implemented with a shorter MGRP 202, for example a 10 millisecond (ms) MGRP 202a, or a 20 ms MGRP (not shown). This is compared to a legacy MGRP 204, which may have a 40 ms MGRP.

In embodiments, the UE may be configured with the legacy measurement gap periods, MGPs, for example an MGRP of 40 ms or 80 ms, as a default by an eNB for legacy compatibility. In order to improve the measurement delay performance, the UE may request, or the network may pre-configure the use of shorter MGP (for example, MGRP=10 ms or 20 ms) in various situations, which may include examples in which the total delay is proportional with the MGRP.

In some embodiments, it may be desirable for the UE to use a shorter MGRP when a possible radio link failure (RLF) is identified. For example, a shorter MGRP may be desirable if the UE (or network) determines a certain number of "Out-of-sync" indications, such as ("N310"), are triggered without an expiration of a radio link failure timer such as ("T310").

Another example of a situation in which a shorter MGRP may be desirable may be when a significant change in a performance metric is detected. For example, a shorter MGRP may be desired if a reference signal received power (RSRP)/reference signal received quality (RSRQ) changes (for example, drops) between adjacent measurement report periods more than a predetermined threshold "R_th," which may be the predefined threshold of a RSRP/RSRQ change range per MGRP.

Another example may be when a measurement in NPG of IncMon. For IncMon there are more carriers to be monitored. In non-limiting examples, when is the value of "N_freq" in Eq(1) is much higher. As a result, in embodiments the total inter-frequency measurement delay will be increased when the value of "N_freq" is larger.

The adaptive shorter measurement gap pattern configuration may be based on the procedures shown below in order to support measurement enhancement in accordance with some embodiments.

Figure 3:
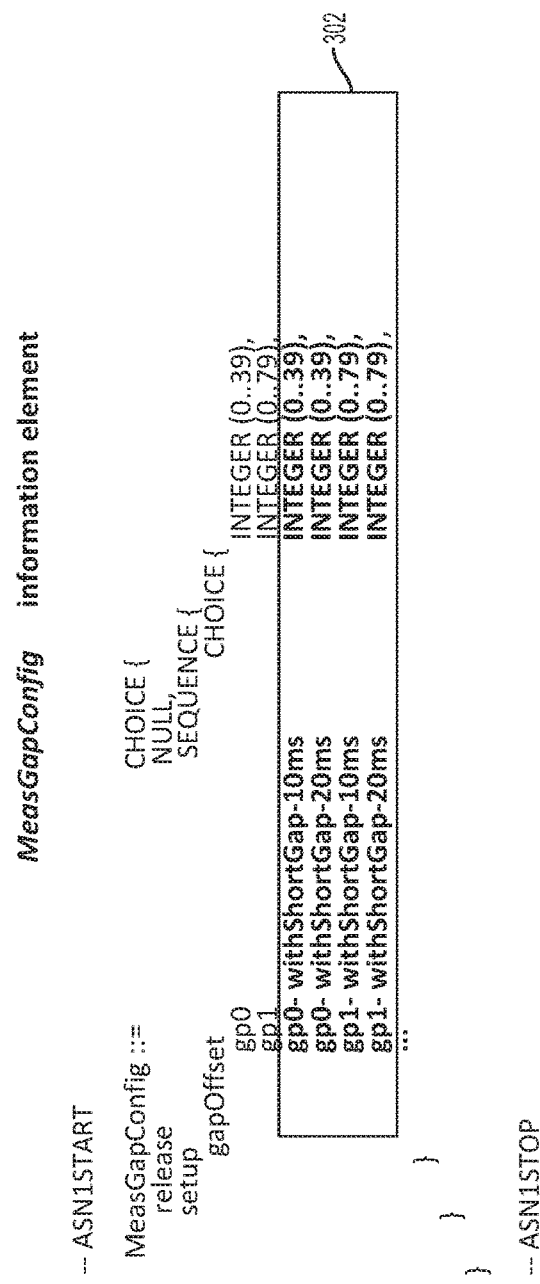
FIG. 3 is a text block illustrating variables that may be added to a measurement gap configuration information element (IE), to change the MGRP, according to embodiments.

FIG. 3 is a text block illustrating additional variables that may be added to a measurement gap configuration (MeasGapConfig) IE to change the MGRP, according to embodiments.

In embodiments, the network may configure the use of a short gap in the measurement gap and the UE may send an indicator when a particular condition is met. Conditions may be specified, for example, in the 3GPP specification. When the UE met such condition, the UE may send an indicator to the network to indicate the start of using a short gap. Implementation of part or of all of these embodiments may include the addition of elements 302 to the MeasGapConfig IE 300, which may specify the measurement gap configuration and may control the setup and/or release of measurement gaps.

The MeasGapConfig IE may be transmitted to the UE in a radio resource control (RRC) connection reconfiguration message when the UE is attaching to the network or at another time. The MeasGapConfig IE may include a number of elements each including a gap pattern type (for example, gp0 or gp1), to identify a gapOffset, and a periodicity. The periodicity of the elements 302 are explicitly shown as 10 or 20 ms. The periodicity of the first two elements may be a legacy periodicity, for example, 40 ms.

Figure 4:
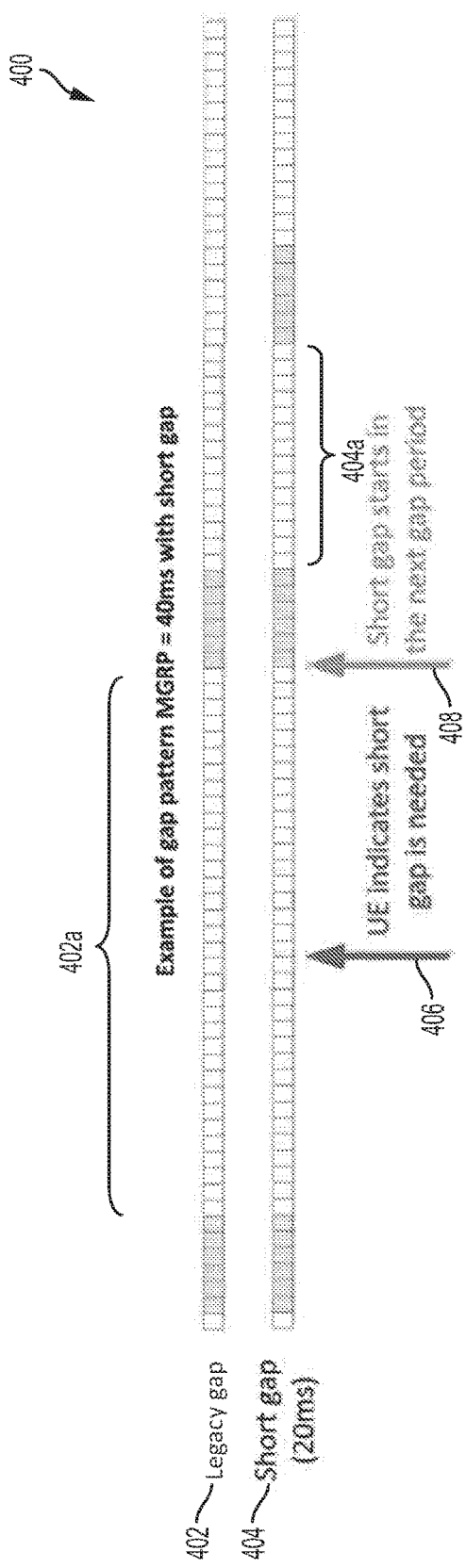
FIG. 4 is a diagram illustrating the transition from a regular MGRP to a shorter MGRP, according to embodiments.

FIG. 4 is a diagram 400 illustrating a transition from a regular MGRP to a short MGRP, according to embodiments. Diagram 400 illustrates a legacy gap 402 having a 40 ms MGRP 402a, along with a short gap 404 having a 20 ms MGRP 404. In embodiments, the UE may send a short gap indicator 406 to the network to indicate that a short gap is needed. The UE may then proceed to implement measurements based on the short gap in the next gap period at 408.

In some embodiments the UE may send the short gap indicator 406 to the network when a predetermined UE condition is met. The predetermined UE condition may be, for example, the RSRP level being below a certain threshold or a receipt of an out-of-sync signal. When the UE indicates need of short gap, in embodiments the UE may receive an indication to begin the short gap in the next gap pattern. This way, the gap offset may remain the same and the network knows when the UE starts short gap and there will be no down link transmission.

Figure 5:
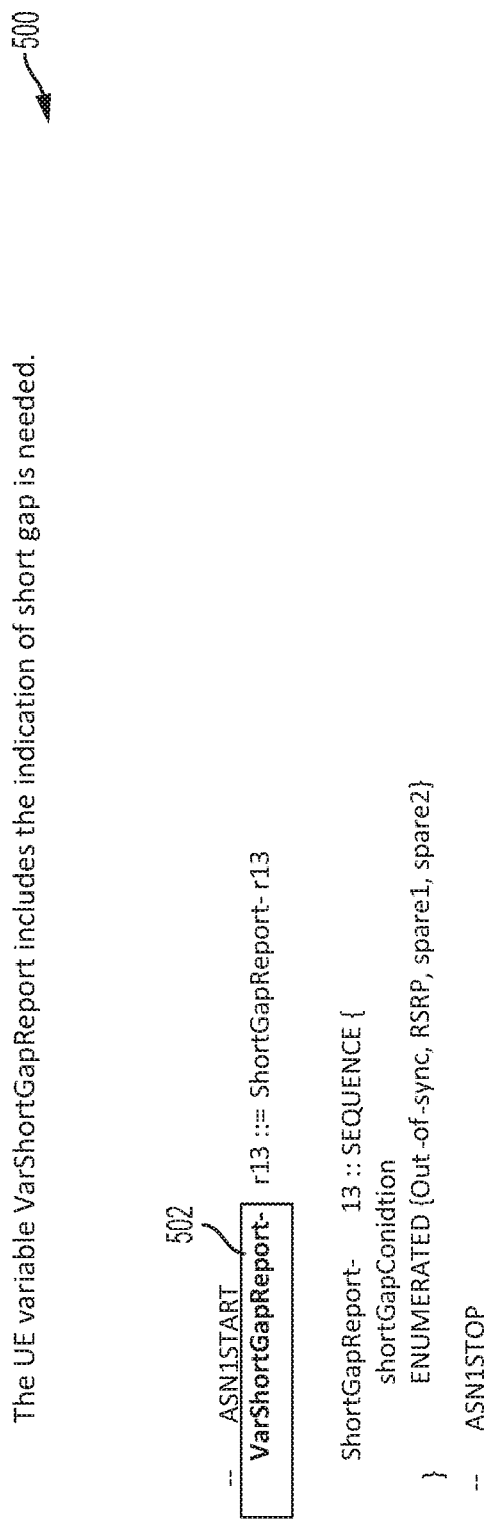
FIG. 5 is a text block illustrating a UE variable to indicate that a short gap is to be used, according to embodiments.

FIG. 5 is a text block 500 illustrating a UE variable to indicate that a short gap is to be used, according to embodiments. In embodiments, a new IE variable may be implemented and used by the UE to report the use of short gap, for example the variable VarShortGapReport 502, that includes the indication that a short gap is needed.

Figure 6A:
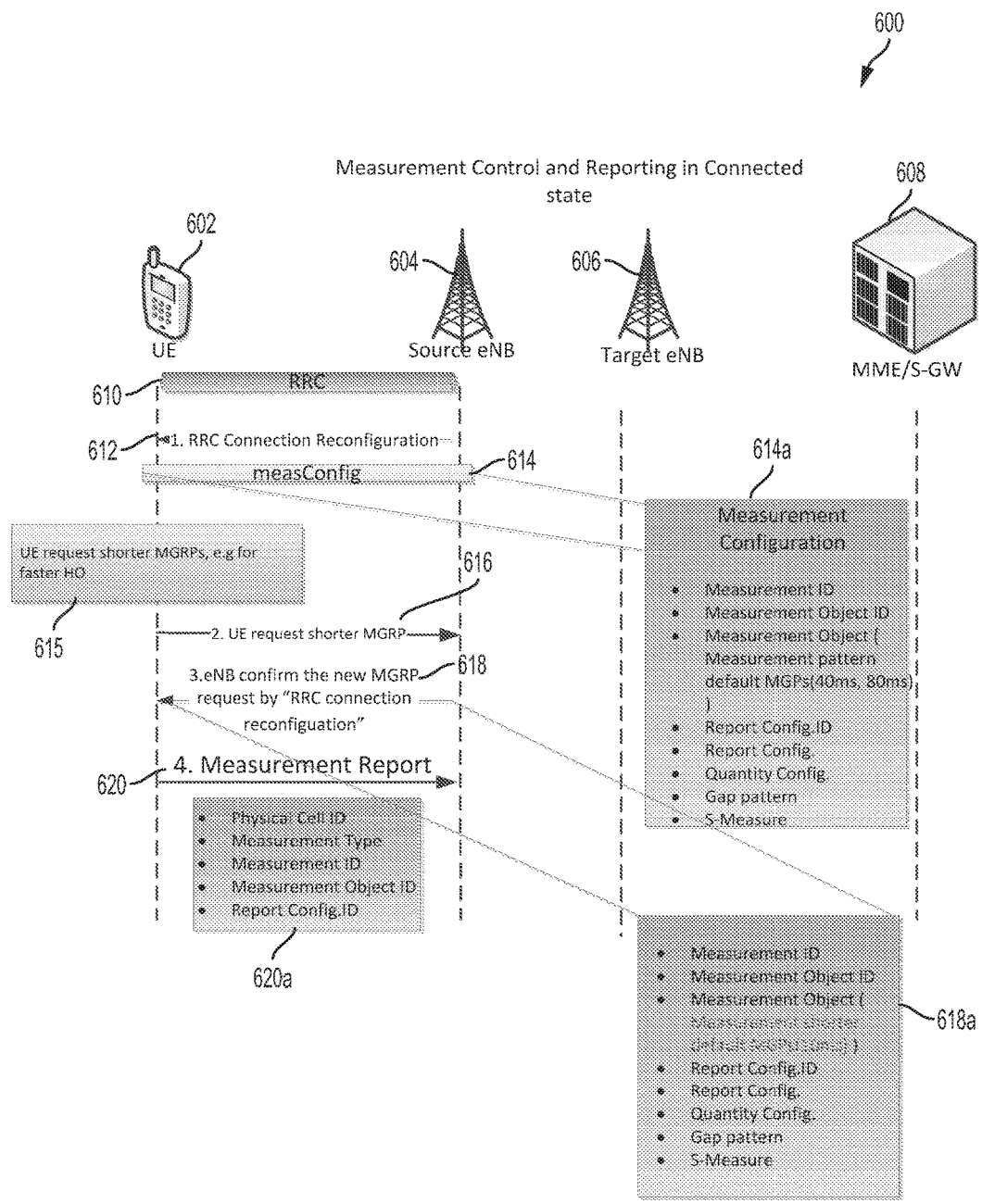
FIG. 6A is a diagram illustrating the use of a radio resource control (RRC) connection reconfiguration request (RRCConnectionReconfiguation) message by a UE to request the use of a short measurement gap, according to embodiments.

FIG. 6A is a diagram 600 illustrating the use of an RRC Connection Reconfiguration request by a UE to request the use of a short MGRP, according to embodiments. In various embodiments, the RRCConnectionReconfiguration message may be a command to modify an RRC connection. It may convey information for measurement configuration, mobility control, radio resource configuration (including resource blocks (RBs), medium access control (MAC) main configuration and physical channel configuration) including any associated dedicated non-access stratum (NAS) information and security configuration. The RRCConnectionReestablishmentRequest message may be used to request the reestablishment of an RRC connection. In various embodiments, either RRConnectionReconfiguration or RRCConnectionReestablishmentRequest may be used to indicate a new measurement gap pattern.

Diagram 600 includes a UE 602, a source eNB 604, a target eNB 606, and a mobility management entity (MME) serving gateway (S-GW). The diagram 600 may correspond to measurement control and reporting when the UE 602 is in a connected state with, for example, the source eNB 604.

In embodiments, an initial RRC connection may be established between the UE 602 and the source eNB 604 at 610. At 612, the source eNB 604 may transmit an RRC connection reconfiguration message to the UE 602. In embodiments, a measConfig IE 614 may be included in the RRC connection reconfiguration message to communicate measurement configuration variables to the UE 602. The measurement configuration IE 614a may include, but is not limited to: a measurement identifier (ID); a measurement object ID; a measurement object, for example, a measurement pattern default MGP of 40 ms or 80 ms; a report configuration ID, a report configuration, a quantity configuration, a gap pattern, and an S-measure. In embodiments, an S-measure parameter may indicate to a UE if it should perform measurements of intra-frequency, inter-frequency and inter-RAT neighboring cells.

At 615, the UE may detect that a predetermined UE condition for requesting a shorter MGRP is met. Then, at 616, the UE 602 may transmit a request to the source eNB to request a shorter MGRP. In response, at 618, the source eNB 604 may send a confirmation message, which may include an RRC connection reconfiguration IE, to the UE 602 to confirm the new MGRP request. The RRC connection reconfiguration IE 618 may contain values for variables 618a. The variables 618a may correspond to the variables in the measurement configuration IE 614a, except may include a short default time for measuring MGPs (for example, 10 ms).

At 620, the UE 602 may transmit a measurement report to the eNB 604. The measurement report may include variables 620a including, for example, a physical cell ID of a cell provided by target eNB 606, a measurement type, a measurement ID, a measurement object ID, and a report configuration ID as described above.

Figure 6B:
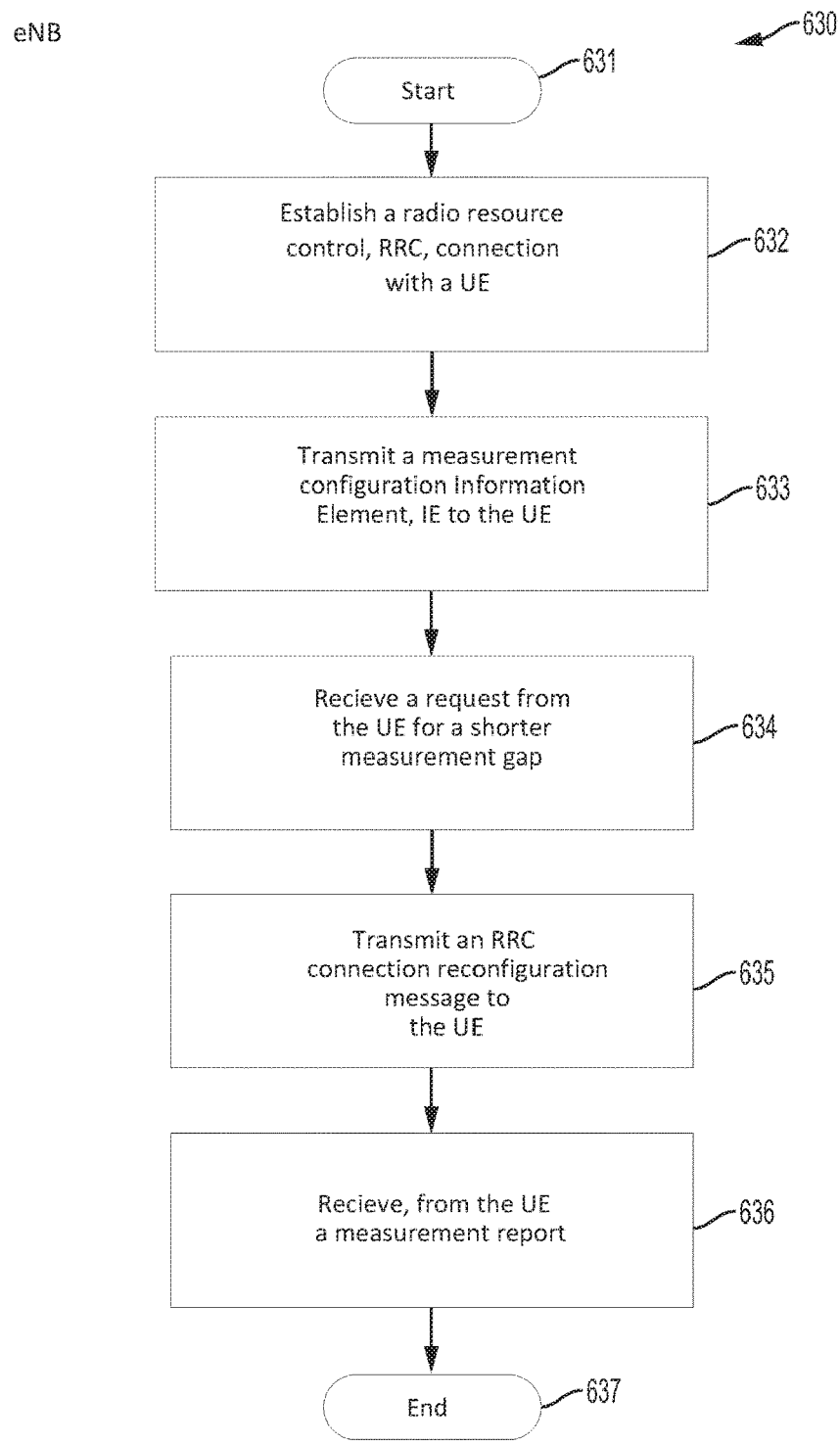
FIG. 6B is a diagram illustrating the use of a radio resource control connection reestablishment request (RRCConnectionReestablishmentRequest) by an enhanced node B (eNB) to request the use of a measurement gap with shorter MGRP, according to embodiments.

FIG. 6B is a flow diagram 630 for an eNB to implement the use of the RRC Connection Reestablishment Request to request the use of a short MGRP, according to embodiments. The process 630 may be similar to the process described in diagram 600.

At block 631, the process may start.

At block 632, the eNB may establish an RRC connection with the UE, in which a legacy measurement gap may be used to save power. Examples of a legacy measurement gap may include 40 ms or 80 ms.

At block 633, the eNB may transmit a measurement configuration information element to the UE.

At block 634, the eNB may receive a request from the UE for a shorter measurement gap.

At block 635, the eNB may transmit an RRC connection reconfiguration message to the UE.

At block 636, the eNB may receive, from the UE, a measurement report. This measurement report may be similar to the measurement report 620a.

At block 637, the process may end.

Figure 6C:
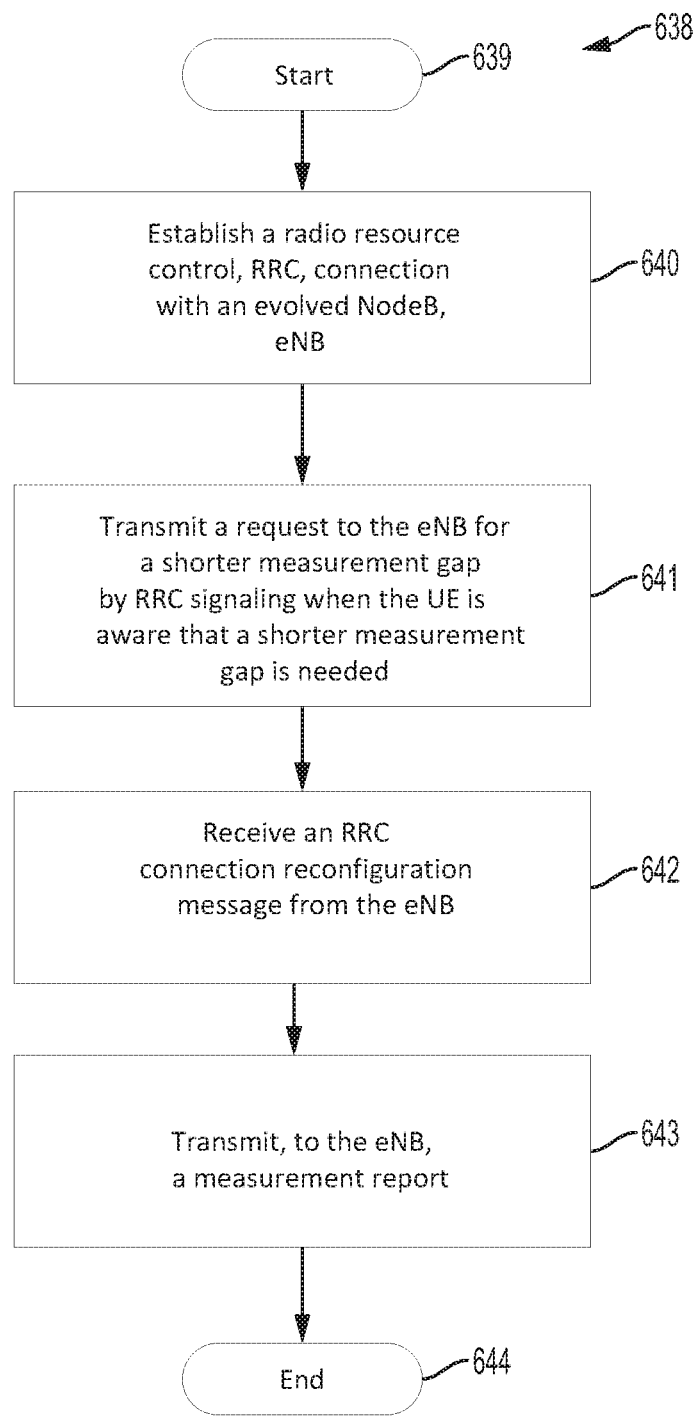
FIG. 6C is a block diagram for implementing the use of the RRCConnectionReestablishmentRequest to request the use of a measurement gap with shorter MGRP by a UE, according to embodiments.

FIG. 6C is a block diagram 638 for a UE to implement the use of the RRC Connection Reestablishment Request to request the use of a short MGRP, according to embodiments. The process 638 may be similar to the process described in diagram 600.

At block 639, the process may start.

At block 640, the process may establish a radio resource control, RRC, connection with an evolved NodeB, eNB.

At block 641, the process may transmit a request to the eNB for a shorter measurement gap by RRC signaling, when the UE is aware that a shorter gap is needed.

At block 642, the process may receive an RRC connection reconfiguration message from the eNB.

At block 643, the process may transmit, to the eNB, a measurement report.

At block 644, the process may end.

FIG. 6D is a text block 650 illustrating a short measurement gap request (shortMeasGapRequest) variable within an RRCConnectionReestablishmentRequest message to request a relatively shorter MGRP, according to embodiments. The shortMeasGapRequest may be provided in a reestablishment case field to indicate that the reestablishment request is for purposes of requesting a measurement pattern that is shorter than a measurement pattern with which a UE is currently configured.

Figure 6E:
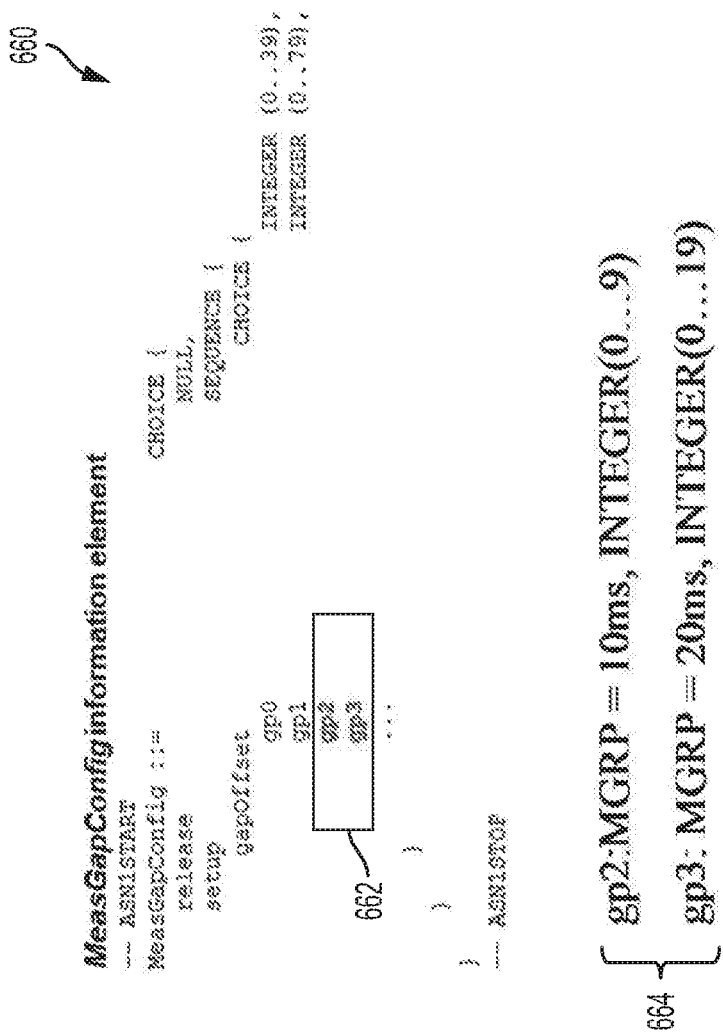
FIG. 6E is a text block illustrating a measurement gap configuration (MeasGapConfig) IE to indicate a shorter MGRP, according to embodiments.

FIG. 6E is a text block 660 illustrating a measurement gap configuration (MeasGapConfig) IE to indicate a shorter MGRP, according to embodiments. In some embodiments, the MeasGapConfig IE may be included in the RRC connection reconfiguration message transmitted by the source eNB 618 of FIG. 6A.

Within text block 660, the variables "gp2" and "gp3" 662 may be added to the MeasGapConfig IE as shown. The format of those variables may be as shown at text box 664.

FIG. 6F is a text block illustrating Gap Pattern Configuration IDs to a table 670 that illustrates Gap Pattern Configurations to be Supported by the UE in accordance with some embodiments. The table 670 may be similar to table 8.1.2.1-1 in 3GPP TS36.133 v12.7.0 with the addition of entries 672. The entries 672 correspond to gap pattern ID 2 (for example, gp2) and gap pattern ID 3 (for example, gp3), which are added to the gap pattern configurations supported by a UE.

In some embodiments, the network may configure additional measurement reporting based upon RSRP/RSRQ drops. When such drops occur, a UE, such as UE 602 in FIG. 6A, may trigger measurement reporting with the resulting measurement report being sent to an eNB, such as eNB 604 in FIG. 6A. The eNB may then re-configure a shorter gap for fast measurement. In embodiments, the configuration may be similar to the configuration described in FIGS. 6A-6E.

FIG. 7 is a text block illustrating a measurement object evolved universal terrestrial radio access (MeasObject-EUTRA) IE 700, according to embodiments. Within the MeasObjectEUTRA IE 700, in embodiments, additional variables 702 may be added that may include an out-of-sync indicator and a short gap request enable (shortGapRequest Enable) variable. In some embodiments, the output-of-sync indicator and the shortGapRequest Enable variables may be Boolean values.

If the network configures the out-of-sync indicator to be true, the UE send a measurement report to the network when the UE receives an out of sync indication from a lower layer. If the network configures the shortGapRequestEnable variable to be true, the UE may send a report to indicate short gap is needed when some predetermined condition is satisfied.

FIG. 8A is a text block illustrating a report configuration evolved universal terrestrial radio access (ReportConfigEUTRA) IE 800, according to embodiments. FIG. 8B is a continuation of the text block of FIG. 8A. In embodiments, the UE may request using a short gap through a new measurement event configuration.

In embodiments, the ReportConfigEUTRA IE 800a, 800b may be modified and used by the network to configure the use of a short gap by using a new measurement event. For example, the new eventg1-r13 802, that may include two new variables g1-out-of-sync, and g1-threshold1, where g1-out-of-sync may indicate that radio link failure threshold has exceeded a threshold value g1-threshold1.

Figure 9:
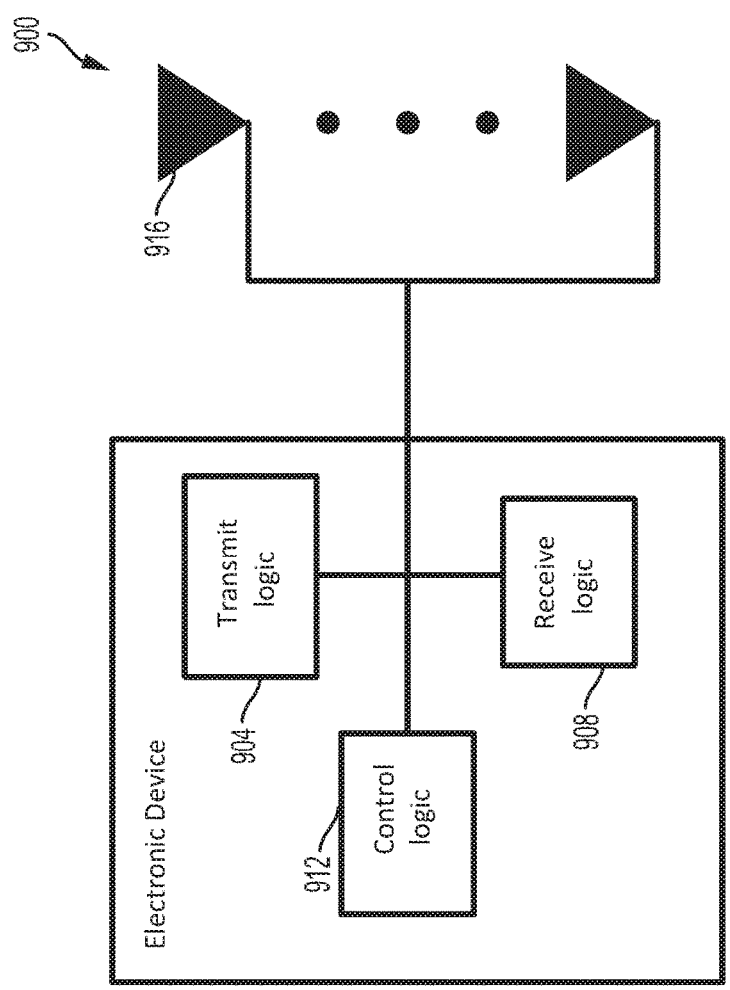
FIG. 9 illustrates a diagram of wireless communication apparatus such as a UE or an evolved NodeB (eNB), according to embodiments.

FIG. 9 illustrates a diagram of an electronic device 900 that may be, or may be incorporated into or otherwise part of, an eNB, a UE, or some other type of electronic device in accordance with various embodiments. Specifically, the electronic device 900 may include logic and/or circuitry that may be at least partially implemented in one or more of hardware, software, and/or firmware. In embodiments, the electronic device 900 may include transmit logic 904 and receive logic 908 coupled to control logic 912. In embodiments, the transmit logic 904 and/or receive logic 908 may be elements or modules of transceiver logic. The electronic device 900 may be coupled with or include one or more plurality of antenna elements of one or more antennas 916. The electronic device 900 and/or the components of the electronic device 900 may be configured to perform operations similar to those described elsewhere in this disclosure.

In embodiments where the electronic device 900 is a UE, or is incorporated into or otherwise part of a UE, the receive logic 908 may receive an indication of a measurement gap configuration. The control logic 912 may identify, based on the indication, a measurement gap repetition period (MGRP) that is less than 40 milliseconds (ms). The control logic 912 may further perform inter-frequency and/or inter-radio access technology (RAT) measurements, using the receive logic 908, based on the measurement gap configuration, and transmit the measurements to an eNB using the transmit logic 904. In some embodiments, the control logic 912 may further determine a predetermined condition occurs, and, based on said determination, use the transmit logic 904 to request that a shorter MGRP be used. If the request is granted, the control logic 912 may receive, via the receive logic 908, a configuration message from the eNB that provides an indication that the shorter MGRP (for example, less than 40 ms, can be used.

In embodiments where the electronic device 900 is an eNB, or is incorporated into or otherwise part of an eNB, the control logic 912 may receive, via the receive logic 908, a request from a UE for a shorter MGRP. The control logic 912 may identify a gap configuration that includes a MGRP that is less than 40 ms and control the transmit logic 904 to transmit an indication of the MGRP.

As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules.

Figure 10:
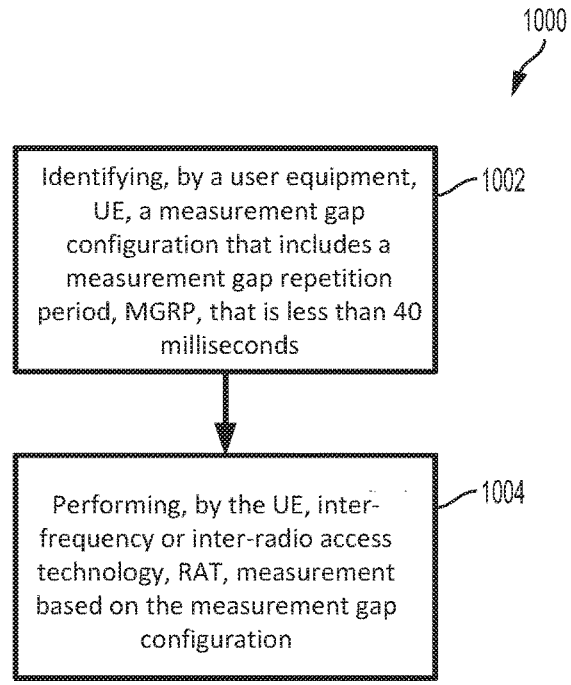
FIG. 10 is a block diagram of a process for performing inter-frequency and/or inter-RAT measurement, according to embodiments.

FIG. 10 is a block diagram of a process for performing inter-frequency and/or inter-RAT measurement, according to embodiments.

In some embodiments, the electronic device of FIG. 9 may be configured to perform one or more processes such as the process 1000 of FIG. 10 in embodiments where the electronic device is a UE, or is incorporated into or otherwise part of a UE.

At block 1002, the process 1000 may include identifying, by a UE, a measurement gap configuration that includes an MGRP that is less than 40 ms.

At block 1004, the process 1000 may include performing, by the UE, inter-frequency and/or inter-radio access technology (RAT) measurements based on the measurement gap configuration.

Figure 11:
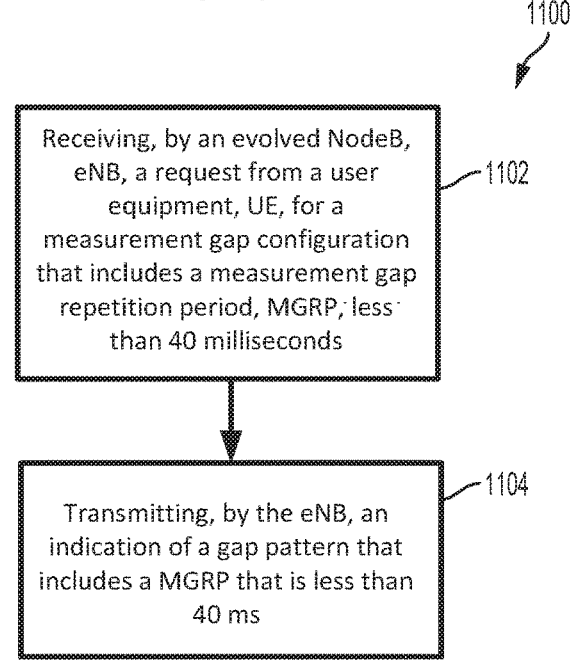
FIG. 11 is a block diagram of a process for transmitting an indication of a gap pattern, according to embodiments.

FIG. 11 is a block diagram of a process for transmitting an indication of a gap pattern, according to embodiments.

In some embodiments, the electronic device of FIG. 9 may be configured to perform one or more processes such as the process 1100 of FIG. 11 in embodiments where the electronic device is an eNB, or is incorporated into or otherwise part of an eNB.

At block 1102, the process 1100 may include receiving, by an evolved NodeB (eNB), a request from a user equipment (UE) for a measurement gap configuration that includes measurement gap repetition period (MGRP) that is less than 40 ms.

At block 1104, the process 1100 may include transmitting, by the eNB, an indication of a gap pattern that includes a MGRP that is less than 40 ms.

Figure 12:
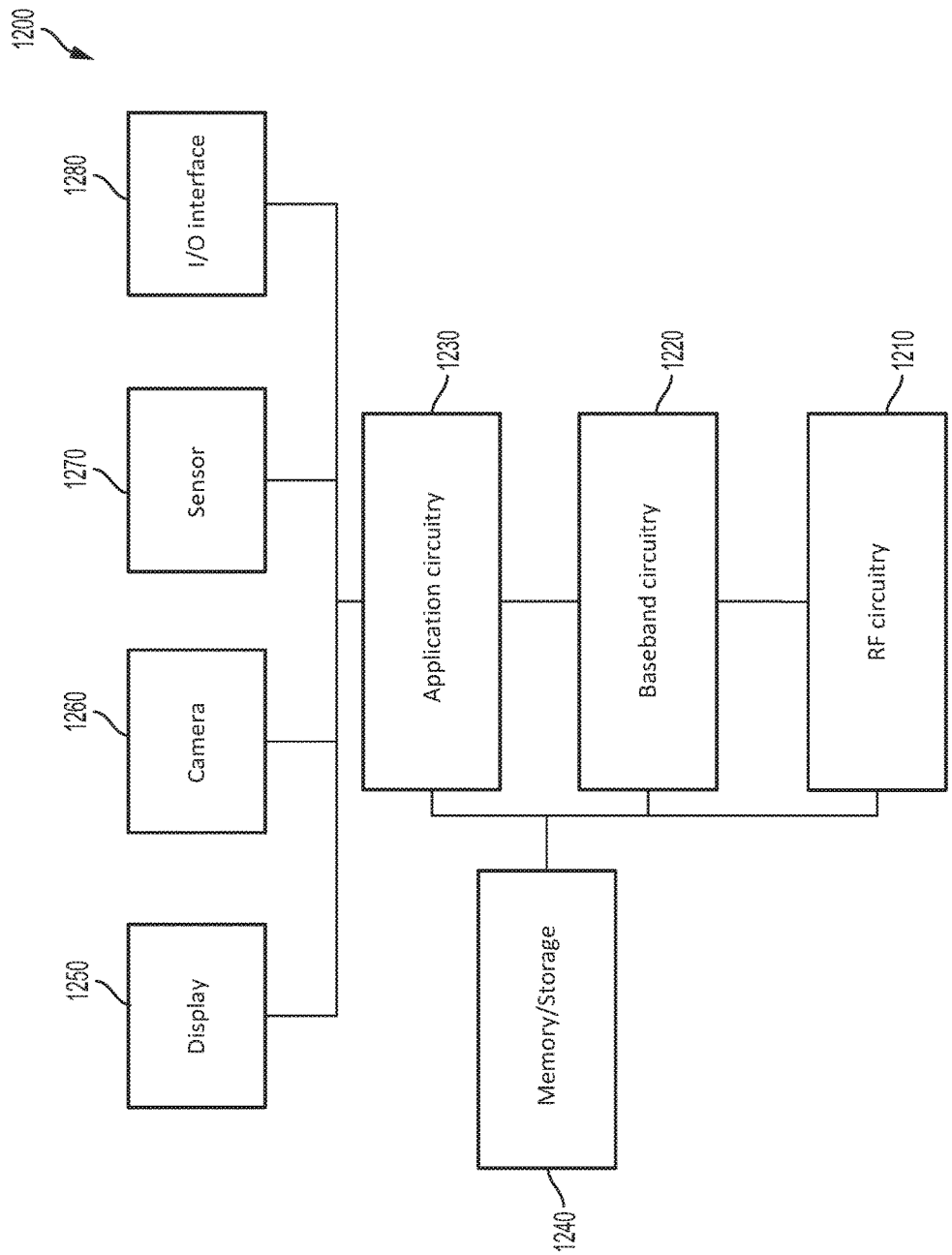
FIG. 12 illustrates a general block diagram of a wireless communication system in accordance with various embodiments.

Embodiments described herein may be implemented into a system using any suitably configured hardware and/or software. FIG. 12 illustrates a general block diagram of a wireless communication system 1200 in accordance with various embodiments of the disclosure including radio frequency (RF) circuitry 1210, baseband circuitry 1020, application circuitry 1230, memory/storage 1240, display 1250, camera 1260, sensor 1270, and input/output (I/O) interface 1280, coupled with each other at least as shown. The wireless communication system 1200 may implement an embodiment of UE 602 or the eNB 604 of FIG. 6A.

The application circuitry 1230 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 1240 and configured to execute instructions stored in the memory/storage 1240 to enable various applications and/or operating systems running on the system.

The baseband circuitry 1220 may include circuitry such as, but not limited to, one or more single-core or multi-core processors. The processor(s) may include a baseband processor. The baseband circuitry 1220 may handle various radio control functions that enable communication with one or more radio networks via the RF circuitry 1210. The radio control functions may include, but are not limited to, signal modulation, encoding, decoding, radio frequency shifting, etc. In some embodiments, the baseband circuitry 1220 may provide for communication compatible with one or more radio technologies. For example, in some embodiments, the baseband circuitry 1220 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1220 is configured to support radio communications of more than one wireless protocol may be referred to as multi-mode baseband circuitry. In various embodiments, the baseband circuitry 1220 may include circuitry to operate with signals that are not strictly considered as being in a baseband frequency. For example, in some embodiments, the baseband circuitry 1220 may include circuitry to operate with signals having an intermediate frequency, which is between a baseband frequency and a radio frequency.

RF circuitry 1210 may enable communication with wireless networks using modulated electromagnetic radiation through a non-solid medium. In various embodiments, the RF circuitry 1010 may include switches, filters, amplifiers, etc. to facilitate the communication with the wireless network. In various embodiments, the RF circuitry 1210 may include circuitry to operate with signals that are not strictly considered as being in a radio frequency. For example, in some embodiments, the RF circuitry 1210 may include circuitry to operate with signals having an intermediate frequency, which is between a baseband frequency and a radio frequency.

In various embodiments, the above-described components of a UE or eNodeB (e.g., processor, transmitter, measurement circuitry, memory, or RF circuitry) may be embodied in whole or in part in one or more of the RF circuitry 1210, the baseband circuitry 1220, and/or the application circuitry 1230. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

The memory/storage 1240 may be used to load and store data and/or instructions, for example, for system. The memory/storage 1240 for one embodiment may include any combination of suitable volatile memory (e.g., dynamic random access memory (DRAM)) and/or non-volatile memory (e.g., Flash memory).

In some embodiments, some or all of the constituent components of the baseband circuitry 1220, the application circuitry 1230, and/or the memory/storage 1240 may be implemented together on a system on a chip (SOC).

In various embodiments, the I/O interface 1280 may include one or more user interfaces designed to enable user interaction with the system 1200 and/or peripheral component interfaces designed to enable peripheral component interaction with the system 1200. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 1270 may include one or more sensing devices to determine environmental conditions and/or location information related to the system 1000. In some embodiments, the sensor 1270 may include, but are not limited to, a gyro sensor, an accelerometer, a proximity sensor, an ambient light sensor, and/or a positioning unit. The positioning unit may also be part of, or interact with, the baseband circuitry 1220 and/or RF circuitry 1210 to communicate with components of a positioning network, e.g., a global positioning system (GPS) satellite.

In various embodiments, the display 1250 may include a display (e.g., a liquid crystal display, a touch screen display, etc.). In various embodiments, the camera 1260 may include a semiconductor imaging device, e.g. a charge coupled device (CCD) imager and/or a complementary metal-oxide-semiconductor (CMOS) imager.

In various embodiments, the system 1200 may be a mobile computing device such as, but not limited to, a laptop computing device, a tablet computing device, a netbook, an Ultrabook™, a smart phone, etc. In various embodiments, the system 1200 may have more or less components, and/or different architectures. For example, in some embodiments the RF logic and/or the baseband logic may be embodied in communication logic (not shown). The communication logic may include one or more single-core or multi-core processors and logic circuits to provide signal processing techniques, for example, encoding, modulation, filtering, converting, amplifying, etc., suitable to the appropriate communication interface over which communications will take place. The communication logic may communicate over wireline, optical, or wireless communication mediums. In embodiments in which the system is configured for wireless communication, the communication logic may include the RF logic and/or baseband logic to provide for communication compatible with one or more radio technologies. For example, in some embodiments, the communication logic may support communication with an evolved universal terrestrial radio access network (EUTRAN) and/or other wireless metropolitan area networks (WMAN), a wireless local area network (WLAN), a wireless personal area network (WPAN).

Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

Examples

Example 1 may be a user equipment, UE, apparatus comprising: radio frequency, RF, circuitry to receive an indication of a measurement gap configuration; baseband circuitry coupled with the RF circuitry, the baseband circuitry to: identify, based on the indication, a measurement gap repetition period (MGRP); and perform inter-frequency or inter-radio access technology, RAT, measurement based on the measurement gap configuration.

Example 2 may include the UE apparatus of Example 1, wherein the measurement gap configuration includes an indication of a measurement gap length that is 6 ms, 2 ms, or some other value that is smaller than 6 ms.

Example 3 may include the UE apparatus of any of Examples 1-2, wherein no data is scheduled to be transmitted/received to/from a serving cell within a length of time indicated by the measurement gap length.

Example 4 may include the UE apparatus of any of Examples 1-2, wherein the baseband circuitry is further to re-tune to a carrier frequency of a cell, which is to be measured by the inter-frequency or inter-RAT measurement, during a length of time indicated by the measurement gap length.

Example 5 may include the UE apparatus of any of Examples 1-4, wherein the RF circuitry is further to: transmit, via radio resource control, RRC, signaling, a measurement gap configuration that includes a shorter MGRP when the baseband circuitry identifies that a faster measurement delay is desired, the measurement delay including cell identification delay.

Example 6 may include the UE apparatus of Example 5, wherein a legacy measurement gap is configured as a default measurement gap for the UE to save power.

Example 7 may include the UE apparatus of any of Examples 5-6, wherein the RF circuitry is further to receive, in response to said request of the measurement gap configuration, an acknowledgement of the request by receipt of an indication of a second MGRP in a radio resource control, RRC, information element, IE, "measGapConfig".

Example 8 may include the UE apparatus of any of Examples 5-7, wherein the baseband circuitry is to further: determine that a pre-defined measurement is met; and
　request the measurement gap configuration based on whether the determined pre-defined measurement candidate is met.

Example 9 may include the UE apparatus of Example 8, wherein determine the pre-defined measurement condition is met includes comparing a reference signal receive power, RSRP, or a reference signal received quality, RSRQ, to a pre-configured threshold value.

Example 10 may include the UE apparatus of any of Examples 8-9, wherein request the measurement gap configuration is based on or associated with one or more measurement reporting events.

Example 11 may include the UE apparatus of Example 10, wherein the baseband circuitry is further to perform the inter-frequency or inter-RAT measurement with a new measurement gap that uses the shorter MGRP.

Example 12 may include the UE apparatus of any one of Examples 1-2, wherein the baseband circuitry is further to perform the inter-frequency or inter-RAT measurement with a new measurement gap over all neighbor measured carriers with prioritized order.

Example 13 may be a user equipment, UE, apparatus comprising: radio frequency, RF, circuitry to periodically receive an indication of a measurement gap configuration; baseband circuitry coupled with the RF circuitry, the baseband circuitry to: identify, based on the indication, a measurement gap repetition period, MGRP; and perform inter-frequency or inter-radio access technology, RAT, measurement based on the measurement gap configuration.

Example 14 may be the UE apparatus of Example 13, wherein the measurement gap configuration includes an indication of a measurement gap length that is 6 ms, 2 ms, or some other value that is smaller than 6 ms.

Example 15 may be the UE apparatus of any of Examples 13-14, wherein no data is scheduled to be transmitted/ received to/from a serving cell within a length of time indicated by the measurement gap length.

Example 16 may be the UE apparatus any of Examples 13-15, wherein the baseband circuitry is further to re-tune to a carrier frequency of a cell, which is to be measured by the inter-frequency or inter-RAT measurement, during a length of time indicated by the measurement gap length.

Example 17 may be the UE apparatus of any of Examples 13-16, wherein the RF circuitry is further to: transmit, via radio resource control, RRC, signaling, a measurement gap configuration that includes a shorter MGRP when the baseband circuitry identifies that a faster measurement delay is desired, the measurement delay including cell identification delay.

Example 18 may be the UE apparatus of any of Examples 13-17, wherein a legacy measurement gap is configured as a default measurement gap for the UE to save power.

Example 19 may be the UE apparatus of any of Examples 13-18, wherein the RF circuitry is further to receive, in response to said request of the measurement gap configuration, an acknowledgement of the request by receipt of an indication of a second MGRP in a radio resource control, RRC, information element, IE, "measGapConfig."

Example 20 may be the UE apparatus of Examples 13-19, wherein the baseband circuitry is to further: determine that a pre-defined measurement is met; and request the measurement gap configuration based on whether the determined pre-defined measurement candidate is met.

Example 21 may be the UE apparatus of Example 20, wherein determine the pre-defined measurement condition is met includes comparing a reference signal receive power, RSRP, or a reference signal received quality, RSRQ, to a pre-configured threshold value.

Example 22 may be the UE apparatus of any one of Examples 20-21, wherein request the measurement gap configuration is based on or associated with one or more measurement reporting events.

Example 23 may be the UE apparatus of any one of Examples 14-22, wherein the baseband circuitry is further to perform the inter-frequency or inter-RAT measurement with a new measurement gap that uses the shorter MGRP.

Example 24 may be the UE apparatus of any one of Examples 14-23, wherein the baseband circuitry is further to perform the inter-frequency or inter-RAT measurement with a new measurement gap over all neighbor measured carriers with prioritized order.

Example 25 may be an evolved NodeB, eNB, apparatus comprising: radio frequency, RF, circuitry to receive a request from a user equipment, UE, for a measurement gap configuration that includes measurement gap repetition period, MGRP, that is less than 40 milliseconds, ms; baseband circuitry coupled with the RF circuitry, the baseband circuitry to identify a gap configuration that includes a MGRP that is less than 40 ms; and wherein the RF circuitry is further to transmit logic to transmit an indication of a gap pattern that includes the MGRP that is less than 40 ms.

Example 26 may be the eNB of Example 25, wherein the request is received in radio resource control, RRC, signaling.

Example 27 may be the eNB of any one of Examples 25-26, wherein the RF circuitry is to transmit the indication in a "measGapConfig" information element, IE.

Example 28 may be a method for gap measurement configuration of a user equipment, UE, comprising: identifying, by a user equipment, UE, a measurement gap configuration that includes a measurement gap repetition period, MGRP, that is less than 40 milliseconds, ms; and performing, by the UE, inter-frequency or inter-radio access technology, RAT, measurement based on the measurement gap configuration.

Example 29 may be the method of Example 28, wherein the measurement gap configuration includes an indication of a measurement gap length that is 6 ms, 2 ms, or some other value that is smaller than 6 ms.

Example 30 may be the method of Example 29, wherein no data is scheduled to be transmitted to a serving cell within a length of time indicated by the measurement gap length.

Example 31 may be the method of any one of Examples 29-30, further comprising re-tuning, by the UE, to a carrier frequency of a cell, which is to be measured by the inter-frequency or inter-RAT measurement, during a length of time indicated by the measurement gap length.

Example 32 may be the method of any one of Examples 28-31, further comprising requesting, by the UE via radio resource control, RRC, signaling, a measurement gap configuration that includes a shorter MGRP when it is identified that a faster measurement delay is desired, wherein the faster measurement delay includes cell identification delay.

Example 33 may be the method of any one of Examples 25-32, wherein a legacy measurement gap is configured as a default measurement gap for the UE to save power.

Example 34 may be the method of any one of Examples 32-33, further comprising receiving, in response to said requesting the measurement gap configuration, an indication of a second MGRP in a "measGapConfig" information element, IE.

Example 35 may be the method any of Examples 32-34, further comprising: determining a pre-defined measurement condition is met; and requesting the measurement gap configuration based on the determining that the pre-defined measurement condition is met.

Example 36 may be the method of Example 35, wherein determining the pre-defined measurement condition is met includes comparing a reference signal receive power, RSRP, or a reference signal received quality, RSRQ, to a threshold value.

Example 37 may be the method of any of Examples 32-36, wherein the requesting of the measurement gap configuration is based on or associated with one or more measurement reporting events.

Example 38 may be the method of any of Examples 32-37, further comprising performing, by the UE, the inter-frequency or inter-RAT measurement with a new measurement gap with the shorter MGRP.

Example 39 may be the method of any of Examples 34-38, further comprising performing, by the UE, the inter-frequency or inter-RAT measurement with new measurement gap over all neighbor carriers to be measured with prioritized order.

Example 40 may be a method comprising: receiving, by an evolved NodeB, eNB, a request from a user equipment, UE, for a measurement gap configuration that includes a measurement gap repetition period, MGRP, less than 40 milliseconds, ms; and transmitting, by the eNB, an indication of a gap pattern that includes a MGRP that is less than 40 ms.

Example 41 may be the method of Example 40, wherein the request is received in radio resource control, RRC signaling.

Example 42 may be the method of any of Examples 40-41, wherein the transmitting includes transmitting the indication in a "measGapConfig" information element, IE.

Example 43 may be an apparatus comprising means to perform the method of any one of Examples 29-42.

Example 44 may be one or more non-transitory computer-readable media comprising instructions to cause an electronic device, upon execution of the instructions by one or more processors of the electronic device, to perform the method of any one of Examples 29-42.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. A user equipment, UE, apparatus comprising:
   radio frequency, RF, circuitry to receive an indication of a measurement gap configuration;
   baseband circuitry coupled with the RF circuitry, the baseband circuitry to:
      identify, based on the indication, a measurement gap repetition period, MGRP, of the measurement gap configuration;
      identify, based on the indication, a measurement gap length of the measurement gap configuration, wherein the measurement gap length is less than 6 milliseconds, ms; and
      perform inter-frequency or inter-radio access technology, RAT, measurement based on the measurement gap configuration.

2. The UE apparatus of claim 1, wherein the measurement gap length is 2 ms.

3. The UE apparatus of claim 2, wherein no data is scheduled to be transmitted/received to/from a serving cell within a length of time indicated by the measurement gap length.

4. The UE apparatus of claim 2, wherein the baseband circuitry is further to re-tune to a carrier frequency of a cell, which is to be measured by the inter-frequency or inter-RAT measurement, during a length of time indicated by the measurement gap length.

5. The UE apparatus of claim 1, wherein the RF circuitry is further to:
   transmit, via radio resource control, RRC, signaling, a measurement gap configuration that includes a shorter MGRP when the baseband circuitry identifies that a faster measurement delay is desired, the measurement delay including cell identification delay.

6. The UE apparatus of claim 5, wherein a legacy measurement gap is configured as a default measurement gap for the UE to save power.

7. The UE apparatus of claim 5, wherein the RF circuitry is further to receive, in response to a request of the measurement gap configuration, an acknowledgement of the request by receipt of an indication of a second MGRP in a radio resource control, RRC, information element, IE, "measGapConfig".

8. The UE apparatus of claim 5, wherein the baseband circuitry is to further:
   determine that a pre-defined measurement candidate is met; and
   request the measurement gap configuration based on whether the determined pre-defined measurement candidate is met.

9. The UE apparatus of claim 8, wherein determine the pre-defined measurement condition is met includes comparing a reference signal receive power, RSRP, or a reference signal received quality, RSRQ, to a pre-configured threshold value.

10. The UE apparatus of claim 8, wherein request the measurement gap configuration is based on or associated with one or more measurement reporting events.

11. The UE apparatus of claim 10, wherein the baseband circuitry is further to perform the inter-frequency or inter-RAT measurement with a new measurement gap that uses the shorter MGRP.

12. The UE apparatus of claim 2, wherein the baseband circuitry is further to perform the inter-frequency or inter-RAT measurement with a new measurement gap over all neighbor measured carriers with prioritized order.

13. A user equipment, UE, apparatus comprising:
   radio frequency, RF, circuitry to periodically receive an indication of a measurement gap configuration;
   baseband circuitry coupled with the RF circuitry, the baseband circuitry to:
      identify, based on the indication, a measurement gap repetition period, MGRP, of the measurement gap configuration;
      identify, based on the indication, a measurement gap length of the measurement gap configuration, wherein the measurement gap length is less than 6 milliseconds, ms; and
      perform inter-frequency or inter-radio access technology, RAT, measurement based on the measurement gap configuration.

14. The UE apparatus of claim 13, wherein the measurement gap length is 2 ms.

15. The UE apparatus of claim 13, wherein no data is scheduled to be transmitted/received to/from a serving cell within a length of time indicated by the measurement gap length.

16. The UE apparatus of claim 14, wherein the baseband circuitry is further to re-tune to a carrier frequency of a cell, which is to be measured by the inter-frequency or inter-RAT measurement, during a length of time indicated by the measurement gap length.

17. The UE apparatus of claim 16, wherein the baseband circuitry is to further:
   determine that a pre-defined measurement is met; and
   request the measurement gap configuration based on whether the determined pre-defined measurement candidate is met.

18. The UE apparatus of claim 17, wherein the baseband circuitry is further to perform the inter-frequency or inter-RAT measurement with a new measurement gap that uses a shorter MGRP.

19. An evolved NodeB, eNB, apparatus comprising:
   radio frequency, RF, circuitry to receive a request from a user equipment, UE, for a measurement gap configuration that includes a measurement gap repetition period, MGRP, that is less than 6 milliseconds, ms;
   baseband circuitry coupled with the RF circuitry, the baseband circuitry to identify a gap configuration that includes the MGRP that is less than 6 ms; and
   wherein the RF circuitry is further to transmit logic to transmit an indication of a gap pattern that includes the MGRP that is less than 40 ms.

20. The eNB of claim 19, wherein the request is received in radio resource control, RRC, signaling.

21. The UE apparatus of claim 1, wherein the indication further includes an out of sync indicator.

22. The UE apparatus of claim 13, wherein the indication further includes an out of sync indicator.

* * * * *